United States Patent
Colin et al.

(10) Patent No.: US 9,914,587 B2
(45) Date of Patent: Mar. 13, 2018

(54) STORAGE DEVICE (71) Applicant: AREVA NC, Paris (FR)

(72) Inventors: Bruno Colin, Orange (FR); Luc Collette, Pont Saint Esprit (FR)

(73) Assignee: AREVA NC, Courbevoie (FR)

( * ) Notice: Subject to any disclaimer, the term of this patent is extended or adjusted under 35 U.S.C. 154(b) by 484 days.

(21) Appl. No.: 14/402,484

(22) PCT Filed: May 21, 2013

(86) PCT No.: PCT/EP2013/060391
§ 371 (c)(1),
(2) Date: Nov. 20, 2014

(87) PCT Pub. No.: WO2013/174802
PCT Pub. Date: Nov. 28, 2013

(65) Prior Publication Data
US 2015/0129736 A1 May 14, 2015

(30) Foreign Application Priority Data
May 22, 2012 (FR) ...................................... 12 54664

(51) Int. Cl.
*G21F 5/00* (2006.01)
*G21C 19/06* (2006.01)
(Continued)

(52) U.S. Cl.
CPC .............. *B65G 1/12* (2013.01); *G21C 19/065* (2013.01); *G21F 5/065* (2013.01); *G21F 5/14* (2013.01); *G21F 7/00* (2013.01); *G21F 7/06* (2013.01)

(58) Field of Classification Search
CPC . G21F 5/00; G21F 5/005; G21F 5/008; G21F 5/06; G21F 5/065; G21F 5/14; G21C 19/065; G21C 19/10
(Continued)

(56) References Cited

U.S. PATENT DOCUMENTS 2,514,909 A * 7/1950 Strickland ............... G21F 5/065
221/82
2,856,781 A * 10/1958 Forbes .................... F16H 25/12
123/56.2
(Continued)

FOREIGN PATENT DOCUMENTS

CN 102001567 A 4/2011
CN 201984841 U 9/2011
(Continued)

OTHER PUBLICATIONS

Office Action issued in CN Patent Application No. 201380027274.3 dated Apr. 25, 2016, with English translation (10 pgs.).
(Continued)

*Primary Examiner* — Sharon M Davis
(74) *Attorney, Agent, or Firm* — Nixon Peabody LLP (57) ABSTRACT

Position-indexed storage device comprising a support and a basket installed on the support, the basket comprising a plurality of compartments distributed around a longitudinal axis, the basket comprising a central passage with a longitudinal axis, the support comprising a shaft with a longitudinal axis, the shaft being housed in the passage such that relative displacement is possible between the basket and the support along the longitudinal axis, and mechanical means for displacement of the basket relative to the support by a given angle about the longitudinal axis are supported by the internal surface of the passage and the external surface of the shaft, said mechanical displacement means being actuated in each cycle, each cycle comprising a relative separation or (Continued)

approach displacement along the longitudinal axis of the basket and the support.

13 Claims, 6 Drawing Sheets

(51) Int. Cl.
  *B65G 1/12* (2006.01)
  *G21F 5/06* (2006.01)
  *G21F 5/14* (2006.01)
  *G21F 7/00* (2006.01)
  *G21F 7/06* (2006.01)

(58) Field of Classification Search
  USPC .................................................. 74/54, 55, 56
  See application file for complete search history.

(56) References Cited

U.S. PATENT DOCUMENTS

| | | | |
|---|---|---|---|
| 3,179,243 | A | 4/1965 | Ashcroft |
| 3,483,380 | A | 12/1969 | Antonsen et al. |
| 4,569,623 | A | 2/1986 | Goldman |
| 4,909,544 | A | 3/1990 | Noe |
| 5,219,215 | A | 6/1993 | Akagawa et al. |
| 5,504,343 | A | 4/1996 | Besnier |
| 5,765,405 | A | 6/1998 | Jung et al. |
| 6,024,482 | A | 2/2000 | Heyraud |
| 7,372,060 | B2 | 5/2008 | Barnes et al. |
| 2005/0196263 | A1 | 9/2005 | Tamura |
| 2008/0087849 | A1 | 4/2008 | Barnes et al. |
| 2010/0038377 | A1 | 2/2010 | Pages et al. |
| 2011/0232111 | A1 | 9/2011 | Duval et al. |
| 2013/0167972 | A1 | 7/2013 | Peressoni |

FOREIGN PATENT DOCUMENTS

| | | |
|---|---|---|
| EP | 0 390 483 A2 | 3/1990 |
| FR | 1465775 A | 3/1967 |
| FR | 2 505 718 A1 | 11/1982 |
| FR | 2 574 385 A1 | 7/1986 |
| FR | 2 617 817 A1 | 2/1989 |
| FR | 2 682 902 A1 | 4/1993 |
| FR | 2694122 A1 | 1/1994 |
| FR | 2 743 005 A1 | 7/1997 |
| FR | 2 964 091 A1 | 3/2002 |
| FR | 2 845 371 A1 | 4/2004 |
| FR | 2 911 128 A1 | 1/2007 |
| FR | 2 937 027 A1 | 4/2010 |
| GB | 424851 | 3/1935 |
| GB | 1220027 A | 1/1971 |
| GB | 2098578 A | 11/1982 |
| JP | 2009-47668 A | 3/2009 |
| RU | 2331123 C2 | 8/2008 |

OTHER PUBLICATIONS

International Search Report and Written Opinion for PCT/EP2013/060391 dated Jul. 26, 2013.

French Search Report, Rapport De Recherche Preliminarie for France Application No. 1254664 dated Feb. 5, 2013. (Prior art references are cited in English.)

* cited by examiner

STORAGE DEVICE

CROSS-REFERENCE TO RELATED PATENT APPLICATIONS

This application is a National Phase of International Application No. PCT/EP2013/060391, filed on May 21, 2013, entitled STORAGE DEVICE, which claims the benefit of French Patent Application No. 12 54664, filed May 22, 2012, the contents of which are incorporated herein by reference in their entirety.

TECHNICAL FIELD AND PRIOR ART

This invention relates to a position-indexed storage device capable of storing objects delivered to one or several given locations.

This storage device may be used for the storage of canister heads or empty canisters used for the transport of materials for the fabrication of nuclear fuel.

Some materials used in fabrication of nuclear fuel, for example MOX fuel are transported in closed and leak tight boxes inside canisters that are themselves closed and leak tight.

For example, for the fabrication of MOX fuel, plutonium oxide is recovered after retreatment of spent fuel and is stored in closed leak tight metal boxes, these boxes being stacked inside a closed leak tight metallic canister. These canisters are then transported from the spent nuclear fuel retreatment installation to the MOX fuel fabrication installation.

When this canister arrives in the MOX fuel fabrication installation, it is opened and the plutonium oxide boxes are unloaded so that the plutonium oxide can be used.

The canister is opened and the plutonium boxes are handled inside a glove box using robots that can be controlled from outside the glove box.

The canister is open by cutting one of its longitudinal ends called the "head", and boxes can then be taken out of the canister for example by gravity.

The heads thus cut off and the empty canisters must be recovered and stored so that they can be subsequently taken out of the glove box for later treatment.

This is done by providing a basket to hold the canister heads and a basket to hold the empty canisters. Each basket is provided with compartments with a vertical axis, each of which holds one canister head or one empty canister.

The canisters are handled by a wheel that rotates about a horizontal axis. Canister heads and empty canisters are evacuated into baskets by gravity. The drop point of the canisters and canister heads is invariable, and the baskets then pivot about a vertical axis so that there is an empty compartment at the drop point ready to receive an empty canister or a canister head.

An actuator driven by an electric motor associated with an encoder is used to rotate the basket by a given angular step so that its angular position is known, to pivot the basket and to correctly position an empty compartment at the drop point.

Encoders are also subject to failure, which is particularly problematic when the device is confined in a glove box that is difficult to access.

Furthermore, this actuator is dedicated solely to displacement of the basket. Therefore, it is quite expensive and the overall dimensions of the system are increased.

PRESENTATION OF THE INVENTION

Consequently, one purpose of this invention is a simple and robust design of an indexed device for storage of objects, for example empty canisters and canister heads.

The purpose stated above is achieved by a storage device comprising a basket with a longitudinal axis and a plurality of compartments distributed about the longitudinal axis, a passage extending along the longitudinal axis, said device also comprising a basket support with an indexing shaft that enters into the passage, and means of indexing the angle of the basket relative to the indexing shaft, supported both by the passage and the indexing shaft, and actuated by relative displacement of the indexing shaft and the passage along the longitudinal axis.

Preferably, the indexing shaft comprises cams around its lateral periphery and the passage includes rollers cooperating with the cams; the rollers move between the cams along a first path when the basket moves away from the indexing shaft along the longitudinal axis, and the rollers move between the cams along a second path when the basket is brought closer to the indexing shaft along the longitudinal axis, such that the angular position of the basket varies by a given step from its position before the basket is moved along the longitudinal axis.

Advantageously, the basket is moved along the longitudinal axis by means of a grab that grips the basket at the longitudinal axis. This grab is advantageously also used to handle objects to be stored in the basket. In the case of transport canisters for boxes of materials that will be used for fabrication of nuclear fuel, the grab is also used to handle full canisters ready for cutting.

The subject-matter of the present invention is then a position-indexed storage device comprising a support and a basket installed on the support, the basket comprising a plurality of compartments distributed around a longitudinal axis, the basket comprising a central passage with a longitudinal axis, the support comprising a shaft with a longitudinal axis, the shaft being housed in the passage such that relative displacement is possible between the basket and the support along the longitudinal axis, and mechanical means for displacement of the basket relative to the support by a given angle about the longitudinal axis are supported by the internal surface of the passage and the external surface of the shaft, said mechanical displacement means being actuated in each cycle, each cycle comprising a relative separation or approach displacement of the basket and the support along the longitudinal axis.

For example, the mechanical displacement means comprise:

cam followers supported by the internal surface of the passage or by the shaft, and cams supported by either the shaft or the inside surface of the passage, that does not support cam followers, said cams defining pairs of cam paths that will guide the cam followers, said cam paths being distributed:

in paths guiding cam followers during a relative separation displacement, called separation cam paths, and in paths guiding cam followers during a relative approach displacement, called approach cam paths.

The mechanical means may comprise a first and a second row each containing n cams where n is an integer equal to more than 1, arranged along the longitudinal axis, the n cams of each row being separated from each other by an angle $360°/n$ about the longitudinal axis, the cams in the first row being offset by an angle equal to $180°/n$ from the cams in the second row.

For example, the cams in the first row comprise at least one face inclined from the longitudinal axis and the cams in the second row comprise at least one face inclined from the longitudinal axis at an inclination opposite the inclination of the inclined faces of the cams in the first row, said inclined faces of the cams in the first and second rows being approximately facing each other.

Cams in each first and second row may comprise faces parallel to the longitudinal axis delimiting the inclined faces such that two successive cams comprise two parallel faces providing longitudinal guidance of cam followers.

Each separation cam path and each approach cam path may for example comprise a first longitudinal guidance portion, at least one skew guidance portion from the longitudinal axis and a second longitudinal guidance portion, in sequence along the longitudinal axis.

A separation cam path and an approach cam path guiding the same cam follower may have at least one longitudinal guidance portion in common, the skew guidance portions of the separation cam path and of the approach cam path having opposite inclinations.

The cam followers are advantageously composed of rollers that project radially from the inside surface of the passage and the cams are supported by the shaft.

For example, the storage device comprises six compartments, where n is equal to 6, such that the basket pivots by an angle of 60° in each cycle. Another subject-matter of the present invention is a handling system comprising at least one position-indexed storage device according to the invention and means of controlling the relative displacement of the basket and the support such that separation and approach cycles can be applied to them.

For example, the displacement means will be used to grip the basket at its axis and apply an up and down movement to it along the longitudinal axis, and the basket comprises at least one means for gripping it.

The displacement means may then consist of a grab.

Another subject-matter of the present invention is an installation with a confinement cell and at least one handling system according to the invention. For example, the installation is fonigured for the fabrication of nuclear fuel.

BRIEF DESCRIPTION OF THE DRAWINGS

This invention will be better understood after reading the following description and appended drawings in which.

DETAILED PRESENTATION OF PARTICULAR EMBODIMENTS

In the following description, the storage device will be described with reference to a transport canister for boxes filled with materials to be used for the fabrication of nuclear fuel.

However, it will be understood that this is one example embodiment, and that this storage device may be used for storage of other objects, either in the nuclear field or in another field.

Figure 1:
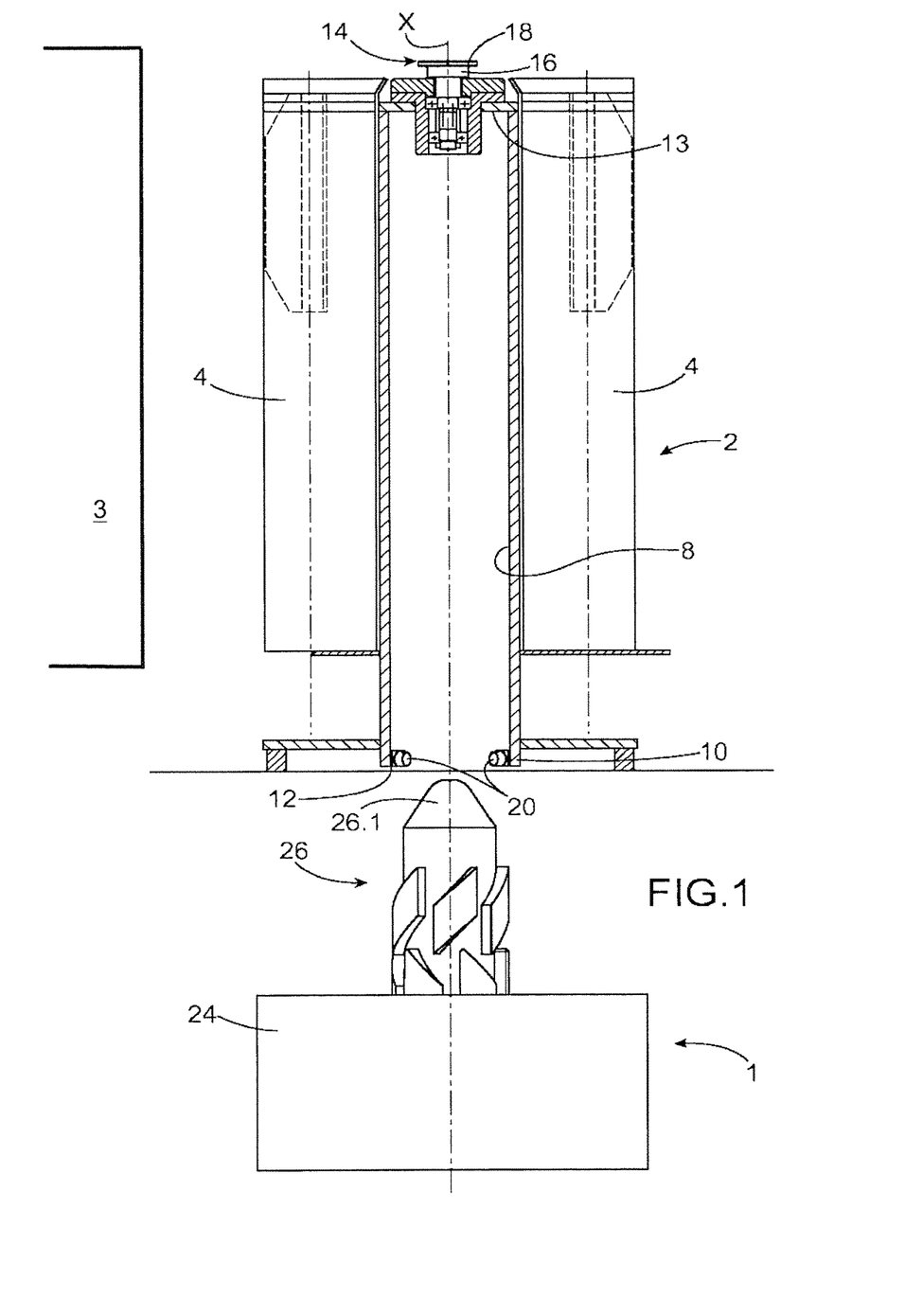
FIG. 1 is a longitudinal sectional view of one example embodiment of a storage device according to the invention.

FIG. 1 shows a longitudinal sectional view of an example embodiment of a device according to the invention. The device has a longitudinal axis X that will be oriented vertically.

The storage device comprises a support 1 and a basket 2. The support 1 and the basket 2 in FIG. 1 are in a separated position. Also shown in FIG. 1 is a partial view of a confinement cell 3.

Figure 2A:
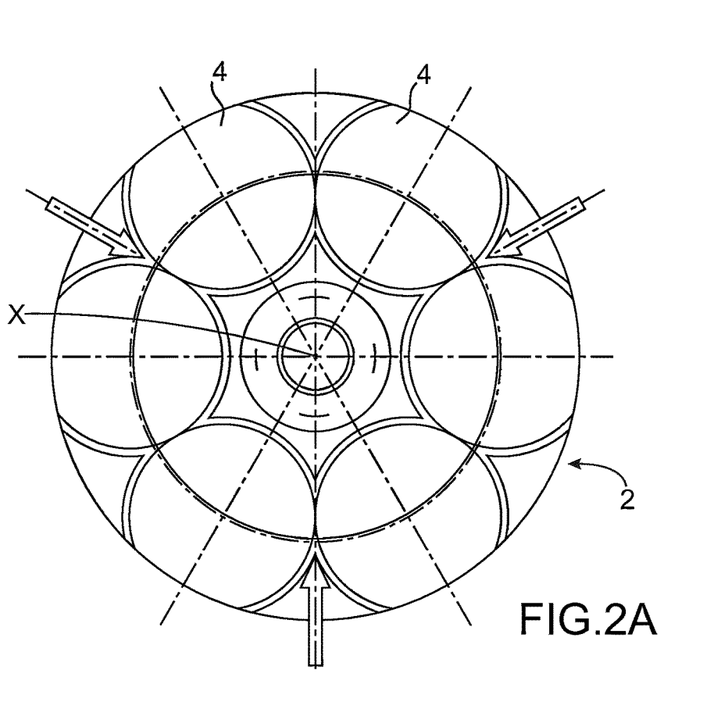
FIG. 2A is a top view of the basket of a storage device in FIG. 1.

FIG. 2A is a top view of the basket 2 that will contain empty canisters.

In the example shown, the basket 2 is in the shape of a cylinder of revolution with axis X, comprising six compartments 4 distributed at uniform angles around the X-axis. An empty canister is in the form of a tube closed at one of its longitudinal ends; therefore it is elongated in shape. The shape of the compartments is such that it can hold canisters and canister heads.

The number of compartments is not limitative and it may be less or more than six.

Furthermore, in the example shown, the compartments do not comprise a closed sidewall, but the sidewall is open at the external periphery of the basket. The walls of the compartments are such that they surround the canisters sufficiently to hold them in place.

The depth of the compartments 4 is such that they can hold the empty canisters. In the case of a basket to store canister heads, the basket may be the same as the basket used for canisters, and in this case several heads can be loaded in each compartment, or a basket with shallower compartments could be used in which each will contain a single canister head.

The basket 2 comprises a passage 8 with axis X located at the centre of the compartments. The passage 8 opens up into the lower bottom 10 through a central opening 12.

In the example shown, the top end 13 of the passage 8 is closed.

Advantageously, the basket 2 comprises means 14 that will be used to handle the basket by an external system, for example by external gripping means, for example a grab 14a (see FIG. 1B) to move the basket 2 vertically. In the example shown, the means 14 are formed from a disk fixed at one of its faces to the top end 13 of the passage 8 by means of an axis 16 with diameter smaller than the diameter of the disk, such that the disk has a projecting radial edge 18 that can be used to grip it. For example, the grab is fixed to a travelling crane that moves it ready for use at another location of the installation.

Figure 2B:
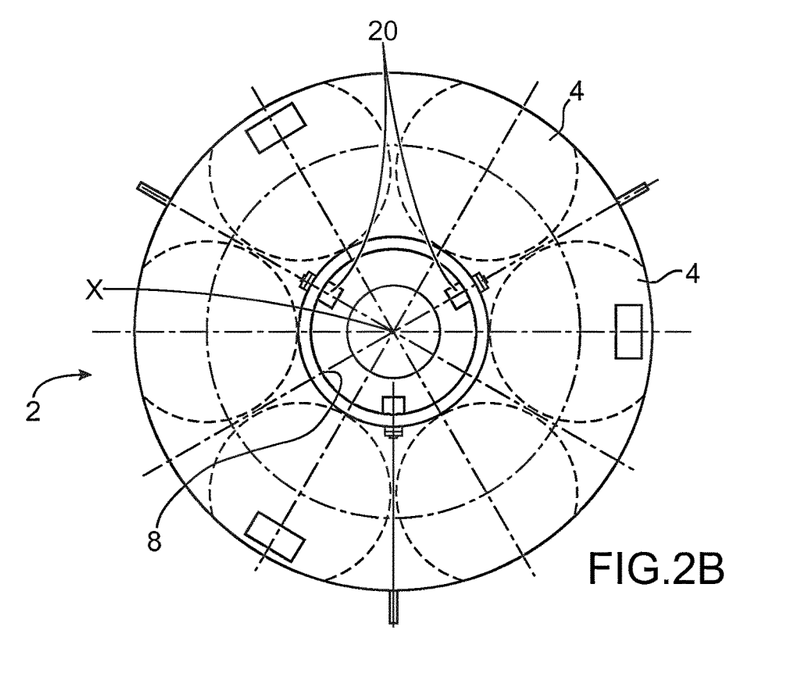
FIG. 2B is a bottom view of the basket in FIG. 1.

The lower opening 12 of the passage 8 comprises three rollers 20 around its periphery projecting radially inwards into the passage and arranged around the X-axis at 120° from each other, as can be clearly seen in FIG. 2B.

The rollers 20 form cam followers as we will see later.

The support 1 comprises a frame 24 that will be arranged approximately horizontally and an indexing shaft 26 with axis X oriented perpendicular to the chassis 24. The indexing shaft 26 will slide in the passage 8.

Figure 3A:
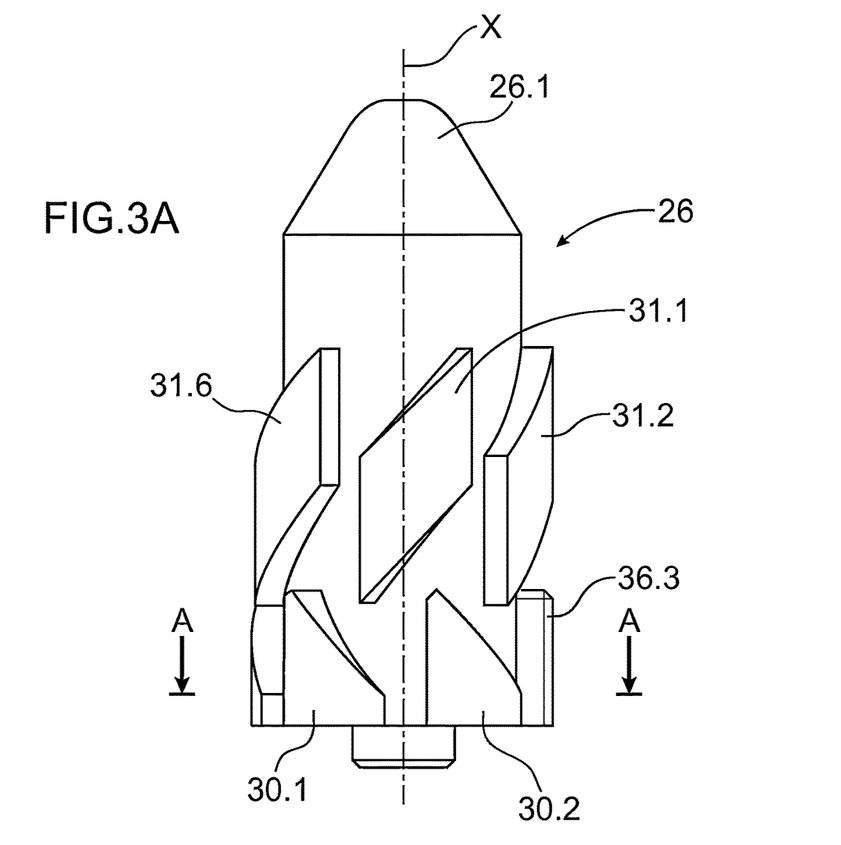
FIG. 3A is a side view of the indexing shaft alone.

FIG. 3A shows the indexing shaft 26 alone; this comprises a lateral surface comprising projecting cams 30.1 to 30.6 and 31.1 to 31.6, and defining cam paths along which the rollers 20 will slide.

In the example shown and advantageously, the free end 26.1 of the indexing shaft 26 comprises a slender approximately frustum shape, facilitating its insertion into the passage 8.

Figure 4:
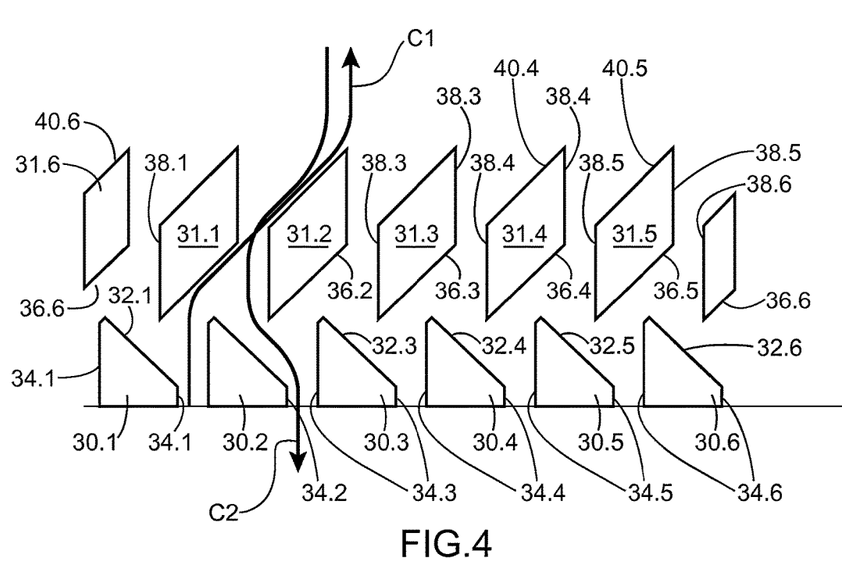
FIG. 4 is a developed view of the indexing shaft of the device in FIG. 3A.

We will now describe details of one example embodiment of the cams and cam paths supported by the indexing shaft with reference to FIG. 4 that is a developed view of the lateral surface of the indexing shaft.

The cams 30.1 to 30.6 and 31.1 to 31.6 are distributed in two rows R1, R2 along the X-axis, and there are six of each of them. The cams are numbered in increasing order around the anticlockwise direction.

The two rows contain the same number of cams. Cams 30.1 to 30.6, 31.1 to 31.6 in each row R1, R2 are distributed at equal angles around the X-axis. Cams 30.1 to 30.6 in row R1 are offset by an angle equal to 30° from cams 31.1 to 31.6 in row R2. Thus, a cam 30.1 is located between two cams 31.1 to 31.6 along the direction of arrow F.

Figure 3B:
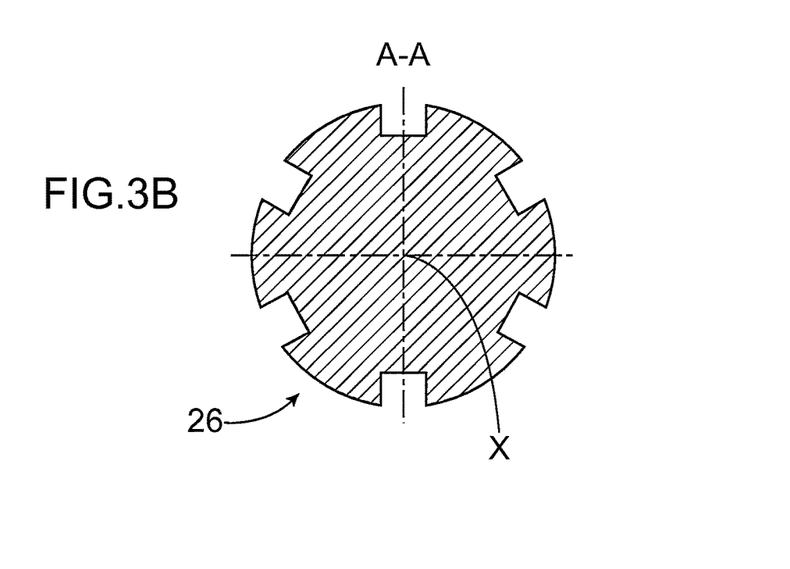
FIG. 3B is a cross-sectional view along plane A-A of the indexing shaft in FIG. 3A.

FIG. 3B shows a sectional view of the indexing shaft 26 along plane A-A. The indexing shaft comprises six locations for the rollers defining the different angular positions that can be occupied by the basket 2.

Each of the cams 30.1 to 30.6 in row R1 located on the side of the chassis 24 comprises a face 32.1 to 32.6 inclined relative to the X-axis located on the side of the free end 26.1 of the indexing shaft 26. In the example shown, the inclined face 32.1 to 32.6 is delimited by two faces 34.1 to 34.6 parallel to the X-axis and the inclined faces 32.1 to 32.6 form an angle of 45° with the X-axis.

Cams 31.1 to 31.6 in row R2 located on the free end 26.1 of the indexing shaft comprise a face 36.1 to 36.6 inclined relative to the X-axis located on the side of the chassis 24 and with inclination opposite the inclination of the inclined face 32.1 to 32.6. In the example shown, the inclined face 36.1 to 36.6 is delimited by two faces 38.1 to 38.6 parallel to the X-axis and the inclined faces 36.1 to 36.6 form an angle of 45° with the X-axis.

In the example shown, the cams 31.1 to 31.6 are in the shape of a non-rectangular parallelogram and therefore comprise a second inclined face 40.1 to 40.6 parallel to the inclined face 36.1 to 36.6 and located on the side of the free end 26.1 of the indexing shaft 26.

The faces of the cams delimit cam paths in separation C1 guiding the rollers during a relative separation of the basket 2 and the indexing shaft 26 and approach cam paths C2 guiding the rollers during a relative approach of the basket 2 and the indexing shaft 26 (FIGS. 3A and 4).

We will now describe operation of the storage device.

As can be seen in FIG. 1, the basket 2 is mounted on the support such that the indexing shaft 26 is located in the passage 8, the rollers 20 then being located close to the chassis 24 of the support, each roller 20 is located between two cams 30.1 to 30.6.

Consider a roller 20 initially located between the cam 30.1 and the cam 30.2. Therefore the roller 20 is located between the vertical faces 34.1 and 34.2.

When the basket 2 has to be pivoted about its X-axis, a grab is lowered to grip the disk 14 and is then raised, causing upwards displacement of the basket 2 along the passage 8. The roller 20 then moves along the separation path C1, and thus slides firstly approximately vertically between the two vertical faces 34.1 and 34.2 of the two cams 30.1, 30.2 respectively, and then laterally and vertically along the inclined face 36.1 of the cam 31.1 and finally approximately vertically between two vertical faces 38.1 and 38.2 of cams 31.1 and 31.2 respectively.

The basket 2 is then lowered, the roller 20 slides along the inclined face 40.2 of the cam 31.2, and then slides between the vertical faces 38.1 and 38.2 of the cams 31.1 and 31.2 respectively and then along the inclined face 32.2 of the cam 30.2, the basket 2 then pivots in the anticlockwise direction from its position. It can be seen that the roller 20 is now located between the vertical faces 34.2 and 34.3 of the cams 30.2 and 30.3 respectively, and is no longer between cams 30.1 and 30.2. Therefore, it has been rotated by 60° about the X-axis. Consequently, the basket has rotated by an angle of 60° in the anticlockwise direction about the X-axis.

Thus, the indexing shaft 26 and the rollers 20 form simple and robust indexing means that do not require any electronic control. Moreover, the position of the compartments can be recorded by counting the number of displacements of the basket, and a compartment may be very simply associated with a canister or a canister head.

With the invention, basket compartments are indexed uniquely mechanically without the use of an encoder or electronic processing means. Therefore, it is very robust and does not require any maintenance.

In the example described, there are common portions in the paths C1 and C2, but it could be envisaged that the two paths do not have any common portions, for example the cams in row R2 could be such that during the approach phase, the roller 20 moves between faces 38.2 and 38.3 of rollers 31.2 and 31.3 and not between faces 38.1 and 38.2 of rollers 31.1 and 31.2.

In the example described, the basket is rotated by displacement of the basket. Alternately, it could be envisaged that the support can be displaced downwards relative to the basket, the arrangement of cams along the X-axis would then be inverted relative to the arrangement in FIG. 3, or the basket and the support could be displaced in separation or in approach to each other.

Figure 1A:
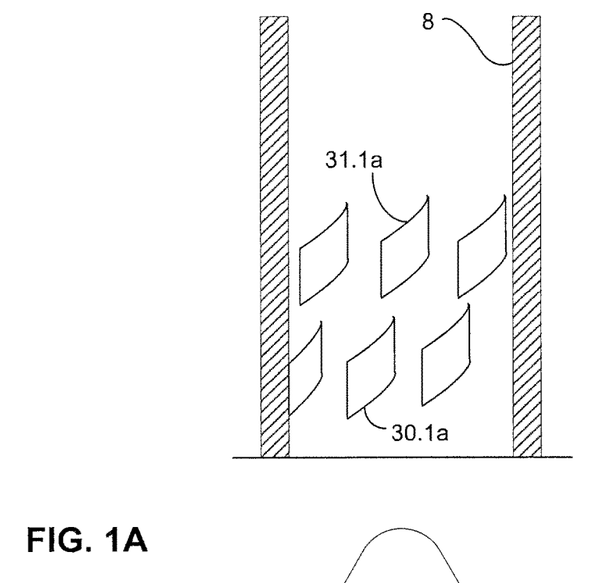
FIG. 1A illustrates an arrangement in which the rollers are disposed on the shaft and cams are disposed in the passage.
Figure 1B:
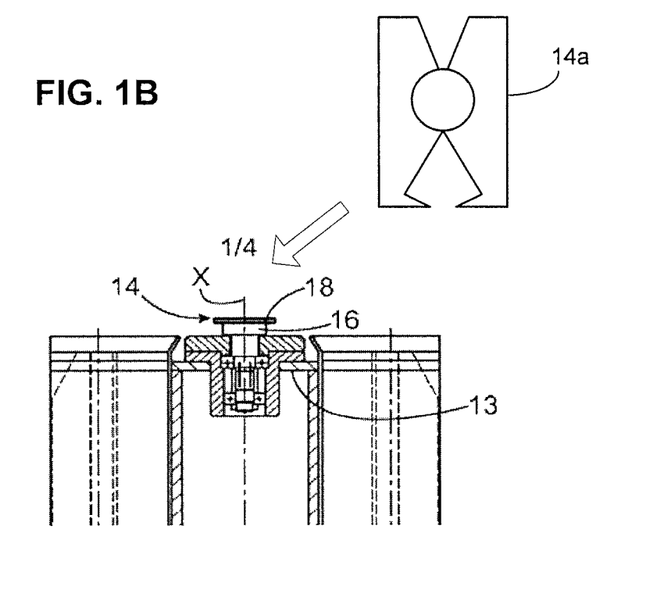
FIG. 1B illustrates an example of a grab as an external gripping means.

A device in which the rollers are supported by the shaft 26 and the cams are supported by an internal surface of the passage 8 is not outside the scope of this invention, particularly in the case of a large device. Such a device is illustrated in FIG. 1A, wherein the rollers 20a are disposed on the shaft 26a, for engagement with cams such as 30.1a and 31.1a disposed in passage 8.

It could also be arranged that the basket is moved by a jack or any other system located under the basket or laterally and capable of moving the basket vertically relative to the support.

It will be understood that the number of rollers is not limited to three. The use of three rollers has the advantage that it provides uniform guidance of the basket relative to the shaft.

Furthermore, the profile and the number of the cams will be adapted as a function of the number of compartments in the basket. For example, in the case of a basket with eight compartments, the indexing shaft may comprise two rows of eight cams. However, the number of cams does not necessarily increase with the number of compartments. It could be arranged that several compartments are loaded simultaneously, for example two; thus a basket with twelve compartments would only need six different angular positions like the device described above.

The use of the grab to displace the basket is particularly advantageous because the grab can be used for other purposes and therefore can be shared, which will reduce the manufacturing cost of the installation. For example for the case of storage baskets of empty canisters and canister heads that have been used for transport of boxes of materials for the fabrication of nuclear fuels such as plutonium oxide, the grab can also be used to handle the full canister ready for opening. It may also be used to move the full basket ready for evacuation.

Therefore the storage device according to the invention can be applied to technical fields in which it is required to collect objects simply.

The invention claimed is:

1. A storage device for storing at least one nuclear material, the storage device comprising:
a basket comprising a plurality of compartments distributed around a longitudinal axis and a central passage extended along said longitudinal axis,
a support on which the basket is mounted, said support comprising a shaft extending along said longitudinal axis, the shaft being housed in the passage, the basket being configured to be displaced along said longitudinal axis and around said longitudinal axis relative to the support, and
mechanical displacement means for displacing in rotation the basket relative to the support by a given angle about said longitudinal axis, said mechanical displacement means being disposed on comprised by an internal surface of the passage and an external surface of the shaft and configured to rotate the basket relative to the support during an operating cycle that comprises a relative separation displacement of the basket along said longitudinal axis and a relative approach displacement of the basket along said longitudinal axis.

2. The storage device according to claim 1, wherein the mechanical displacement means comprise:
cam followers supported by the internal surface of the passage or by the shaft, and
cams supported by either the shaft or the inside surface of the passage, said cams defining pairs of cam paths configured to guide the cam followers, said cam paths being distributed:
in paths guiding cam followers during said relative separation displacement, called separation cam paths and
in paths guiding cam followers during said relative approach displacement, called approach cam paths.

3. The storage device according to claim 2, comprising a first row and a second row each containing n cams, n being an integer equal to more than 1, arranged along the longitudinal axis, the n cams of each row being separated from each other by an angle 360°/n about the longitudinal axis, the cams in the first row being offset by an angle equal to 180°/n from the cams in the second row.

4. The storage device according to claim 2, in which the cam followers comprise rollers that project radially from the inside surface of the passage and the cams are supported by the shaft.

5. The storage device according to claim 3, in which the cams in the first row comprise at least one face inclined from the longitudinal axis and the cams in the second row comprise at least one face inclined from the longitudinal axis at an inclination opposite the inclination of the inclined faces of the cams in the first row, said inclined faces of the cams in the first row and second row being approximately facing each other.

6. The storage device according to claim 5, in which the cams in each first row and second row comprise faces parallel to the longitudinal axis delimiting the inclined faces such that two successive cams comprise two parallel faces providing longitudinal guidance of cam followers.

7. The storage device according to claim 6, in which each separation cam path and each approach cam path comprise a first longitudinal guidance portion, at least one skew guidance portion from the longitudinal axis and a second longitudinal guidance portion, in sequence along the longitudinal axis.

8. The storage device according to claim 7, in which a separation cam path and an approach cam path guiding the same cam follower have at least one longitudinal guidance portion in common, the skew guidance portions of the separation cam path and of the approach cam path having opposite inclinations.

9. The storage device according to claim 3 to comprising six compartments and in which n is equal to 6.

10. A handling system comprising: a storage device according to claim 1; and a displacement device for moving the basket relative to the support along the longitudinal axis.

11. The handling system according to claim 10, wherein the displacement device is configured to grip the basket and apply an up and down movement to it along the longitudinal axis, and the basket further comprises at least one means for being gripped.

12. The handling system according to claim 11, wherein the displacement device is a grab.

13. An installation configured for the fabrication of nuclear fuel, comprising at least one handling system according to claim 12.

* * * * *